(12) United States Patent
Latapie et al.

(10) Patent No.: US 10,282,414 B2
(45) Date of Patent: May 7, 2019

(54) DEEP LEARNING BIAS DETECTION IN TEXT

(71) Applicant: Cisco Technology, Inc., San Jose, CA (US)

(72) Inventors: Hugo Mike Latapie, Long Beach, CA (US); Enzo Fenoglio, Issy-les-Moulineaux (FR); Guillaume Sauvage De Saint Marc, Sèvres (FR); Monique Jeanne Morrow, Zurich (CH); Manikandan Kesavan, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/445,059

(22) Filed: Feb. 28, 2017

(65) Prior Publication Data

US 2018/0246873 A1 Aug. 30, 2018

(51) Int. Cl.
*G06F 3/0484* (2013.01)
*G06F 17/27* (2006.01)
*G06N 3/08* (2006.01)

(52) U.S. Cl.
CPC ......... *G06F 17/274* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,031,829 B2 * | 5/2015 | Leydon | G06F 17/28 704/2 |
| 9,535,896 B2 * | 1/2017 | Bojja | G06F 17/275 |
| 9,804,752 B1 * | 10/2017 | Mall | H04L 67/22 |
| 2014/0079297 A1 * | 3/2014 | Tadayon | G06K 9/00 382/118 |
| 2014/0330760 A1 * | 11/2014 | Meier | G06F 17/3089 706/12 |
| 2015/0324690 A1 * | 11/2015 | Chilimbi | G06N 3/063 706/25 |
| 2016/0104482 A1 * | 4/2016 | Aleksic | G10L 15/22 704/235 |
| 2016/0267070 A1 * | 9/2016 | Bojja | G06F 17/275 |
| 2018/0046340 A1 * | 2/2018 | Mall | H04L 67/22 |
| 2018/0246873 A1 * | 8/2018 | Latapie | G06N 3/08 |

* cited by examiner

*Primary Examiner* — Marcus T Riley
(74) *Attorney, Agent, or Firm* — Behmke Innovation Group LLC; James Behmke; Stephen D. LeBarron

(57) ABSTRACT

In one embodiment, a method includes obtaining text from a user, applying the text to a deep learning neural network to generate a plurality of bias coordinates defining a point in an embedded space, and, in response to determining that at least one of the plurality of bias coordinates exceeds a threshold, providing an indication of bias to the user.

20 Claims, 3 Drawing Sheets

DEEP LEARNING BIAS DETECTION IN TEXT

TECHNICAL FIELD

The present disclosure relates generally to bias detection systems, and in particular, to systems, methods and apparatuses for detecting bias in text using a deep learning architecture.

BACKGROUND

The ongoing development, maintenance, and expansion of digital communication systems involves an increasing amount of text being exchanged between users of communication applications, such as instant messaging applications and e-mail applications. Stereotypes and biases are an intrinsic part of human nature. However, negative biases based on race, gender, age, appearance, culture, political leanings, and even dogmatic positions regarding technologies, methodologies, and the like can be the cause of negative team dynamics and low productivity. In severe cases, employee morale can be adversely impacted, producing high turnover rates. It has been shown that people are often unaware of their own biases, thus making it very difficult for them to improve biased communications that may be adversely affecting those around them.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
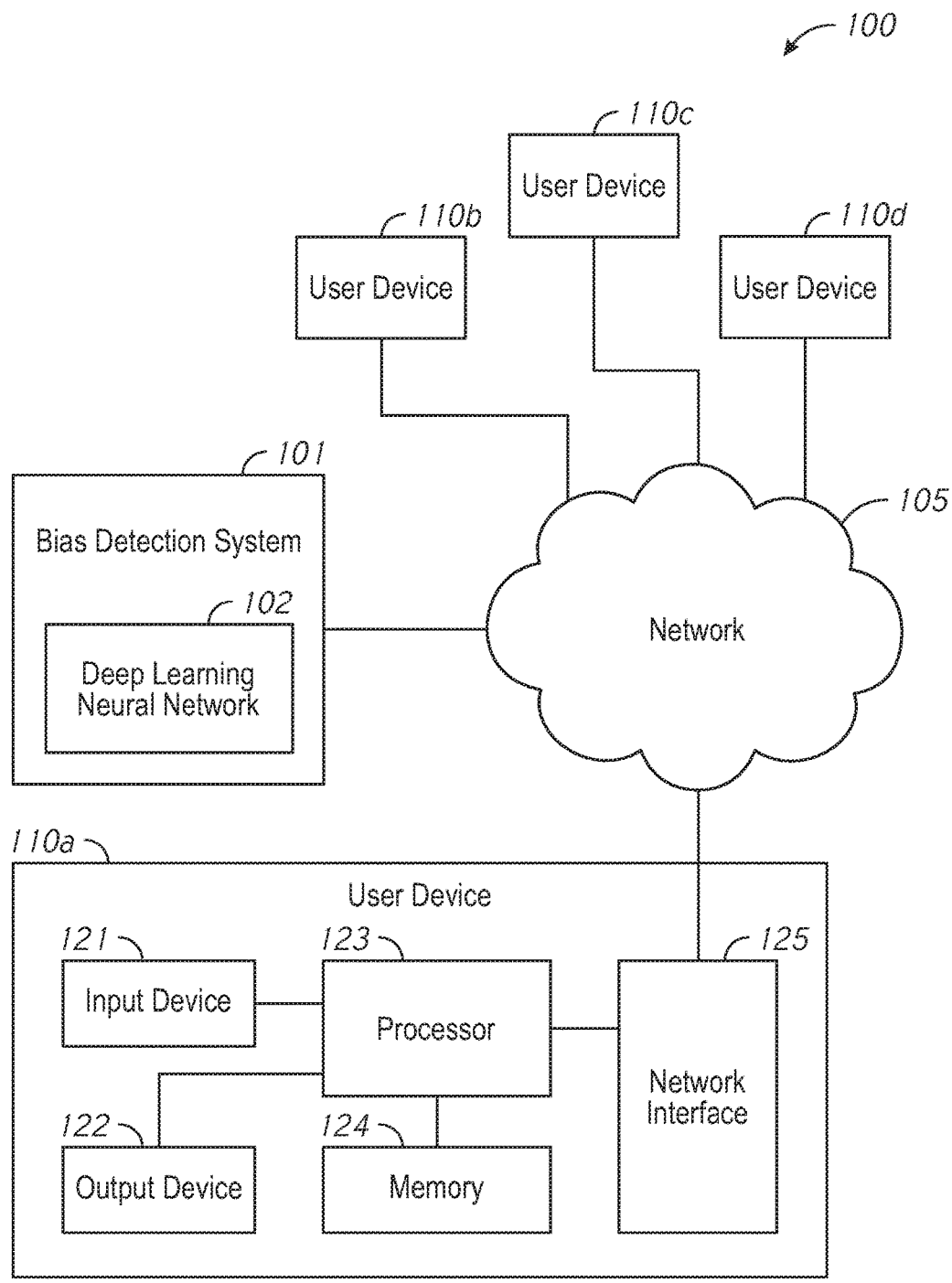
FIG. 1 is a diagram of network environment including a bias detection system.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for processing received data. For example, in some implementations, a method includes obtaining text from a user, applying the text to a deep learning neural network to generate a plurality of bias coordinates defining a point in an embedded space, and, in response to determining that at least one of the plurality of bias coordinates exceeds a threshold, providing an indication of bias to the user.

EXAMPLE EMBODIMENTS

Users communicating with each other may be unaware that their language exhibits bias. Accordingly, in various implementations, a deep learning neural network is employed to detect such biases and inform the user of biases being expressed.

FIG. 1 is a diagram of network environment 100 including a bias detection system 101. The network environment 100 includes a plurality of user devices 110a-110d coupled together via a network 105. The network 105 includes any public or private LAN (local area network) and/or WAN (wide area network), such as an intranet, an extranet, a virtual private network, a cable or satellite network, and/or portions of or the entirety of the internet. A user device 110a includes one or more input devices 121 for receiving input from a user and one or more output devices 122 for providing output to the user. The user device 110a includes a processor 123 for executing various applications, a memory 124 for storing instructions of the various applications, and a network interface 125 for communicating over the network 105.

Users of the user devices 110a-110d can communicate with each by transmitting text over the network 105. For example, using a user device 110a, a user can transmit text to a user of another user device 110b over the network 105. The user can enter the text using an input device 121, e.g., a keyboard or a microphone via a text-to-speech function of the user device 110a. The text can be transmitted via the network interface 125. The text can be embedded in, for example, an instant message of an instant messaging application executed by the processor 123, an SMS (Short Message Service) message of a text messaging application executed by the processor 123, an e-mail of an e-mail application executed by the processor 123, or a word processing document of a word processor application executed by the processor 123.

In various implementations, the text is transmitted, via the network 105, to a bias detection system 101. In some embodiments, the bias detection system 101 is located within the user device 110a. The bias detection system 101 includes a deep learning neural network 102 trained to detect bias in text. The deep learning neural network 102 maps the text to a point in a multidimensional vector space, referred to as an embedded space, where each dimension corresponds to a type of bias. Thus, the deep learning neural network 102 generates a plurality of bias coordinates defining the location of the text in the embedded space.

In various implementations, the bias detection system 101 returns the plurality of bias coordinates to the user device 110a. If one of the plurality of bias coordinates exceeds a threshold (e.g., is above a positive threshold or below a negative threshold), feedback that the text is biased is provided to the user. The feedback can be provided via the output device 122, e.g., a display.

In various implementations, the plurality of bias coordinates includes a gender bias coordinate, in which large positive values indicate a strong male gender bias and in which large negative values indicate a strong female gender bias. For example, a user can input, via the input device 121 into an instant messaging application executed by the processor 123, the sentence "If a woman was driving to the grocery store and heard this ad, would she consider buying a new car or is this the type of ad she'd have to really pay attention to?" The user device 110*a* transmits the sentence, via the network interface 125 over the network 105, to the bias detection system 101. The bias detection system 101 applies the sentence to the deep neural network 102 to determine, among other bias coordinates, a gender bias coordinate.

Such a sentence can map to a point having a large negative gender coordinate, indicating a strong female gender bias. In contrast, the sentence "If a man was driving to the lake to go fishing and heard this ad, would he consider buying a new car or is this the type of ad he'd have to really pay attention to?" may map to a point having a large positive gender coordinate, indicating a strong male gender bias.

The bias detection system 101 returns the gender bias coordinate to the user device 110*a*. In response to determining that the gender bias coordinate exceeds a threshold, e.g., is more negative than a negative threshold, the user device 110*a* provides feedback to the user that the sentence is gender biased. In the context of an instant messaging application, the feedback can be, for example, an icon that turns red when input text is biased and indicates the type of bias upon hovering a cursor over the icon. It is to be appreciated that such bias may be intentional, as the user producing the sentence may wish to target a specific demographic with the advertisement. However, if unintentional, the user may rewrite the sentence before transmitting the text to other users or may attempt to avoid such bias in the future.

In various implementations, the bias detection system 101 can provide a de-biased version of the text to the user device 110*a*. Such a de-biased version can be provided automatically or in response to a request from the user device 110*a*. Whereas the bias detection system 101 can map the example sentence to a plurality of bias coordinates, including a gender bias coordinate having a large negative value, the bias detection system 101 can, likewise, map a point having many of the same plurality of bias coordinates, but with the gender bias coordinate skewed positively, to a de-biased version of the sentence. For example, the de-biased version of the sentence may be "If a person was driving to get lunch and heard this ad, would that person consider buying a new car or is this the type of ad that a person would really have to pay attention to?"

Figure 2:
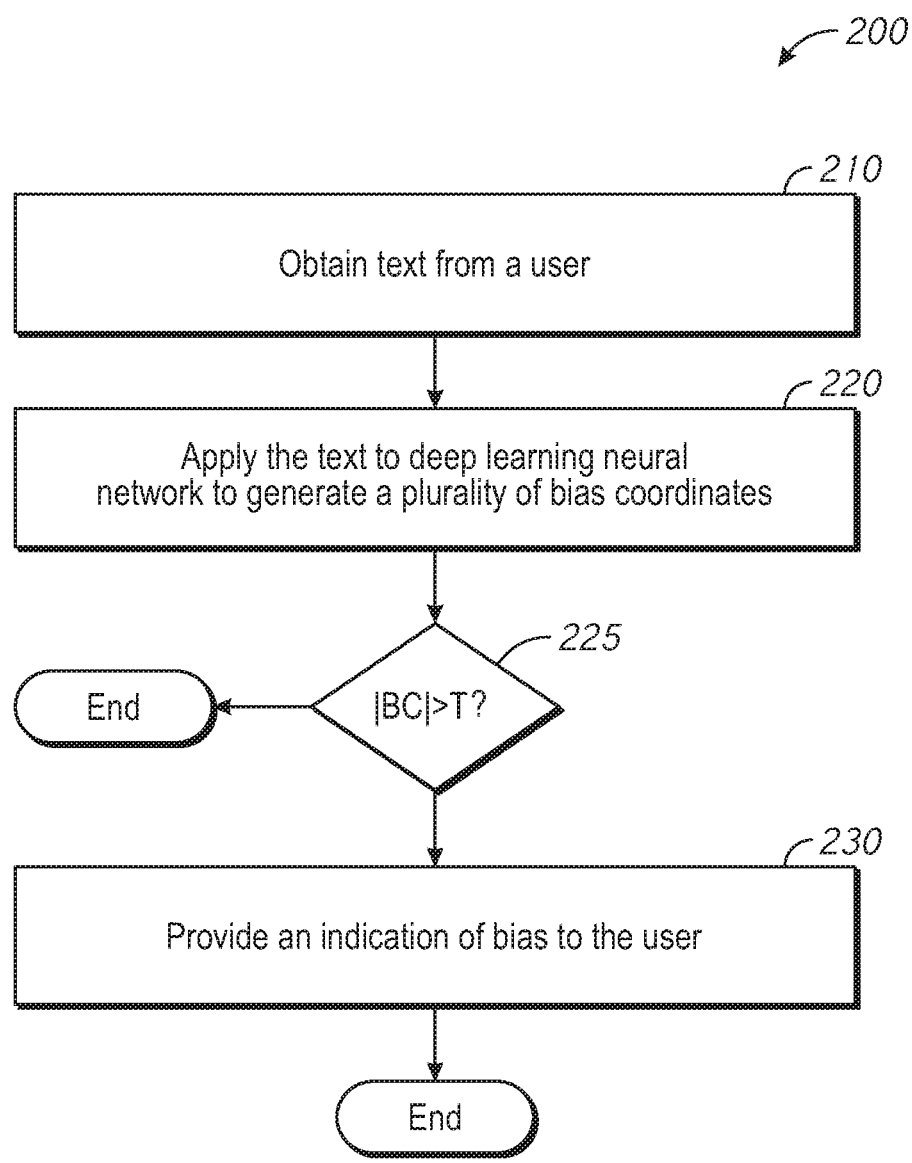
FIG. 2 is a flowchart representation of a method of detecting bias in text using a deep learning neural network in accordance with some implementations.

FIG. 2 is a flowchart representation of a method 200 of detecting bias in text using a deep learning neural network in accordance with some implementations. In some implementations (and as detailed below as an example), the method 200 is performed by a bias detection system (or a portion thereof), such as the bias detection system 101 of FIG. 1. In some implementations, the method 200 is performed by processing logic, including hardware, firmware, software, or a combination thereof. In some implementations, the method 200 is performed by a processor executing code stored in a non-transitory computer-readable medium (e.g., a memory). Briefly, the method 200 includes obtaining text from a user, applying the text to a deep learning neural network, and providing feedback to the user indicative of any bias detected.

The method 200 begins, at block 210, with the bias detection system obtaining text from a user. In various implementations, the bias detection system obtains the text from the user via a network. For example, a user can input the text via a user device and the user device can transmit the text to the bias detection system. In various implementations, the bias detection system is implemented within the user device. In various implementations, the bias detection system obtains the text by receiving user input of text into an instant messaging application, an SMS (short messaging service) application, an e-mail application, or a word processing application. In various implementations, the text includes a plurality of words, such as a sentence, paragraph, or multi-paragraph document. In various implementations, the text includes non-alphabetic characters, such as emojis.

The method continues, in block 220, with the bias detection system applying the text to a deep learning neural network to generate a plurality of bias coordinates. The deep learning neural network embeds the text at a point in a multidimensional vector space defined by the plurality of bias coordinates, e.g., the embedded space. Each dimension of the embedded space corresponds to a respective bias.

In various implementations, the plurality of bias coordinates includes a gender bias coordinate. For example, in some embodiments, a large positive gender bias coordinate indicates that the text has a strong male gender bias and a large negative gender bias coordinate indicates that the text has a strong female gender bias.

In various implementations, the plurality of bias coordinates includes a temporal bias coordinate. For example, in some embodiments, a large positive temporal bias coordinate indicates that the text has a strong modern-language bias and a large negative temporal bias coordinate indicates that the text has a strong archaic-language bias. Thus, the temporal bias coordinate can indicate whether the text includes more modern language, such as slang, colloquialisms, or buzzwords or whether the text includes more archaic language, such as archaisms, politically incorrect terminology, or references to obsolete technologies. As another example, in some embodiments, a large positive temporal bias coordinate indicates that the text has a strong youth bias and large negative temporal bias coordinate indicates that the text has a strong elderly bias. Thus, the temporal bias coordinate can indicate whether the text includes more language used by younger users or older users.

In various implementations, the plurality of bias coordinates includes a locational bias coordinate. As an example, in the English language, in some embodiments, a large positive locational bias coordinate indicates that the text has a strong American bias and a large negative locational bias coordinate indicates that the text has a strong British bias. Thus, the locational bias coordinate can indicate whether the text includes language used primary in America (e.g., "go on vacation," "our team is working well together," or "we don't need to stay") or whether the text includes language primary used in the United Kingdom (e.g., "go on holiday," "our team are working well together," or "we needn't stay"). As another example, in the United States, in some embodiments, a large positive locational bias indicates that the text has strong Southern bias and a large negative locational bias indicates that the text has a strong non-Southern bias. Thus, the locational bias coordinate can indicate whether the text includes language used primarily in the Southern United States (e.g., "y'all," "cut the grass," or "slaw") or whether the text includes language used primary outside the Southern United States (e.g., "you," "mow the lawn," or "coleslaw"). Of course, various implementations can be applied to various non-English languages.

In various implementations, the plurality of bias coordinates includes an emotional bias coordinate. For example, in some embodiments, a large positive emotional bias coordinate indicates that the text has a strong anger bias and a large negative emotional bias coordinate indicates that the text has a strong apologizing bias. Thus, the emotional bias can indicate whether the text has an angry tone or an apologizing tone. As another example, in some embodiments, a large positive emotional bias indicates that the text has strong professional bias and a large negative locational bias indicates that the text has a causal bias. Thus, the emotional bias coordinate can indicate whether the text comes across as overly stilted (e.g., too professional) or overly familiar (e.g., too casual).

In various implementations, the plurality of bias coordinates includes a technological bias coordinate. For example, in some embodiments, a large positive technological bias coordinate indicates that the text has a strong C++ bias and a large negative technological bias coordinate indicates that the text has a strong Java bias. Thus, the technological bias coordinate can indicate whether the text indicates a user preference for a particular technology.

In various implementations, the deep learning neural network is a recurrent neural network (RNN), long/short-term memory neural network (LSTM), or a variational recurrent auto-encoder (VRAE). The deep learning neural network can include a number of interconnected layers. Thus, the deep learning neural network can implement a deep learning architecture including multiple processing layers, composed of multiple linear and/or nonlinear transformations. The deep learning architecture can be generative, discriminative, sequential, and/or reinforcement learning based. Each layer can be implemented as a neural network to produce outputs based on received inputs. Each neural network includes a plurality of interconnected nodes that instruct the learning process and produce the best output according to a suitable loss function that updates the neural network by back-propagation of the gradient of that loss function. In various implementations, the loss functions can be any of the typical loss functions (hinge loss, least square loss, cross-entropy loss, etc.) or can be a custom loss function that incorporates typical linguistic behaviors.

The deep learning neural network can be generated using an unsupervised learning method. The deep learning neural network decomposes each text of the training data into a plurality of bias coordinates. In various implementations, the deep learning neural network is an auto-encoder, such as a restricted Boltzmann machine (RBM) stacked auto-encoder (SAE). Thus, training may be considered complete when the reconstruction error for the training data and the plurality of bias coordinates is below a threshold (e.g., below 5%) or when the deep learning neural network converges to a steady-state (e.g., additional training data does not change the reconstruction error by more than a threshold amount, such as 1%).

As the training is unsupervised, a designer can determine a user-comprehensible meaning of each of the plurality of bias coordinates produced by the unsupervised learning. Thus, if the deep learning neural network decomposes each input text into twenty bias coordinate values, a designer can determine the meaning of one or more of the bias coordinates. This can be performed in a number of ways. In some implementations, the designer selects text from the training data having a large positive value of one of the bias coordinates, selects text from the training data having a large negative value of the one of the bias coordinates, and compares the texts to determine the exhibited bias. Thus, the designer can determine a user-comprehensible meaning of the one of the bias coordinates. For example, if the third bias coordinate is a large positive value for the text "He loves his football" and the third bias coordinate is a large negative value for the text "She is a wonderful mother," the designer can determine that the third bias coordinate is a gender bias coordinate. The designer can repeat this process for each bias coordinate.

In some implementations, the designer applies biased text to the deep learning neural network and inspects the bias coordinates to determine which bias coordinate is high. For example, to determine which of the plurality of bias coordinates is an emotional bias coordinate, the designer can apply the text "You are ridiculously wrong!" to the deep learning neural network, apply the text "I'm sorry, but I believe you are mistaken" to the deep learning neural network, and determine which bias coordinate is most strongly affected. The designer can repeat this process for each bias that the designer wishes to detect.

In various implementations, the deep learning neural network generates the plurality of bias coordinates using other data besides the input text. Thus, the deep learning neural network can be implemented as a multi-model deep learning neural network. In various implementations, the deep learning neural network generates the plurality of bias coordinates using the text and biometric sensor data regarding the user. Thus, bias detection system obtains biometric sensor data regarding the user and applies the biometric sensor data (and the text) to the deep learning neural network to generate the plurality of bias coordinates. In various implementations, the biometric sensor data is obtained from one or more wearable devices of the user.

In some embodiments, the biometric sensor data includes a pupil dilation measurement of the user, a heartrate measurement of the user, or a breathing rate measurement of the user. These measurements can indicate, for example, mental strain and that the text may be overly complicated or formal or can indicate, as another example, excitement and that the text may be racy or workplace-inappropriate.

In some embodiments, the biometric sensor data includes a speech tone analysis (particularly when the text is produced as a speech-to-text result). Such a measurement can indicate, for example, a speed or volume of speech consistent with a heightened emotional state resulting in emotionally biased text.

In some embodiments, the biometric sensor data includes video gesture analysis, posture analysis, eye movement/gaze analysis, skin conductivity measurements, or other biometrics of the user.

The method 200 continues, at block 225, with the bias detection system determining whether one or more of the bias coordinates exceeds a threshold (e.g., the bias coordinate is greater than a positive threshold or less than a negative threshold). If not, the method ends. If so, the method 200 continues to block 230, with the bias detection system providing an indication of bias to the user.

In various implementations, the bias detection system provides an indication of bias to the user via an output device of a user device, e.g., a display. For example, if a user inputs gender biased text into an instant messaging application, the instant messaging application can display a red icon next to the text indicating that the text is biased (and, upon hovering over the icon, display that the text is gender biased). As another example, if a user inputs emotionally biased text into an e-mail application and attempts to send the text as an angry e-mail, a pop-up window can be displayed indicating that the e-mail is emotionally biased ("You seem angry in this letter") and providing option to the user to send it as-is ("Send anyway?"), revise the e-mail ("I'll fix it"), or receive recommendations on de-biasing the text ("How so?").

In various implementations, in providing the indication of bias to the user, the bias detection system provides a de-biased version of the text to the user. Whereas the deep learning neural network maps input text to a point defined by a set of bias coordinates, a modified set of bias coordinates maps to a modified input text. Thus, by normalizing the set of bias coordinates (e.g., reducing the size of those exceeding a threshold), a modified set of bias coordinates can be generated that maps to a de-biased version of the text.

In some embodiments, such reverse mapping may be computationally difficult for large amounts of text. Thus, in various implementations, a large input text is parsed into a plurality of subsections of text and one or more of the plurality of subsections of text is applied to the neural network to generate one or more respective pluralities of bias coordinates. Thus, in some embodiments, only portions of the text that are the most biased are de-biased by reverse mapping.

Figure 3:
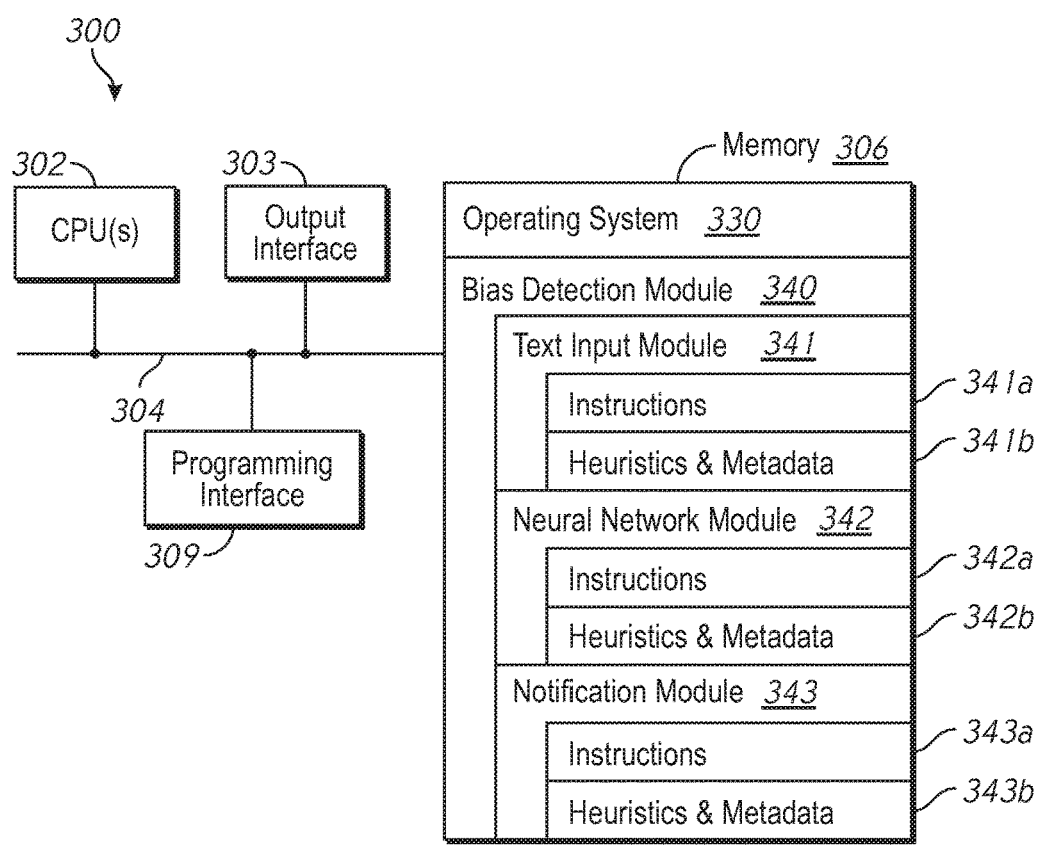
FIG. 3 is a block diagram of a computing device in accordance with some implementations.

FIG. 3 is a block diagram of a computing device 300 in accordance with some implementations. In some implementations, the computing device 300 corresponds to the at least a portion of the bias detection system 100 of FIG. 1 and performs one or more of the functionalities described above with respect to the bias detection systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 300 includes one or more processing units (CPU's) 302 (e.g., processors), one or more input/output interfaces 303 (e.g., a network interface and/or a sensor interface), a memory 306, a programming interface 309, and one or more communication buses 304 for interconnecting these and various other components.

In some implementations, the communication buses 304 include circuitry that interconnects and controls communications between system components. The memory 306 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 306 optionally includes one or more storage devices remotely located from the CPU(s) 302. The memory 306 comprises a non-transitory computer readable storage medium. Moreover, in some implementations, the memory 306 or the non-transitory computer readable storage medium of the memory 306 stores the following programs, modules and data structures, or a subset thereof including an optional operating system 330 and bias detection module 340. In some implementations, one or more instructions are included in a combination of logic and non-transitory memory. The operating system 330 includes procedures for handling various basic system services and for performing hardware dependent tasks. In some implementations, the bias detection module 340 is configured to detect bias in text and provide notifications regarding detected bias. To that end, the bias detection module 340 includes a text input module 341, a neural network module 342, and a notification module 343.

In some implementations, the text input module 341 is configured to obtain text from a user. To that end, the text input module 341 includes a set of instructions 341a and heuristics and metadata 341b. In some implementations, the neural network module 342 is configured to apply the text to a deep learning neural network to generate a plurality of bias coordinates. To that end, the neural network module 342 includes a set of instructions 342a and heuristics and metadata 342b. In some implementations, the notification module 343 is configured to, in response to a determination that at least one of the plurality of bias coordinates exceeds a threshold, provide an indication of bias to the user. To that end, the notification module 343 includes a set of instructions 343a and heuristics and metadata 343b.

Although the bias detection module 340, the text input module 341, the neural network module 342, and the notification module 343 are illustrated as residing on a single computing device 300, it should be understood that in other embodiments, any combination of the bias detection module 340, the text input module 341, the neural network module 342, and the notification module 343 can reside in separate computing devices in various implementations. For example, in some implementations each of the bias detection module 340, the text input module 341, the neural network module 342, and the notification module 343 reside on a separate computing device or in the cloud.

Moreover, FIG. 3 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GP-GPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    obtaining text from a user;
    applying the text to a deep learning neural network to generate a plurality of bias coordinates defining a point in an embedded space, wherein the embedded space is a multi-dimensional vector space defined by the plurality of bias coordinates, each dimension of the embedded space corresponding to a respective bias and a size of each bias coordinate corresponding to an amount of bias; and
    in response to determining that at least one of the plurality of bias coordinates satisfies a bias threshold, providing an indication of bias to the user.

2. The method of claim 1, wherein obtaining the text from the user includes receiving user input of text into at least one of an instant messaging application, a text messaging application, an e-mail application, or a word processing application.

3. The method of claim 1, wherein the text includes a plurality of words.

4. The method of claim 1, wherein the text includes one or more emojis.

5. The method of claim 1, wherein applying the text to the deep learning neural network includes embedding the text at the point in the embedded space bias.

6. The method of claim 1, wherein the deep learning neural network includes a plurality of neural network layers.

7. The method of claim 1, wherein the plurality of bias coordinates includes at least one of a gender bias coordinate, a temporal bias coordinate, a locational bias coordinate, an emotional bias coordinate, or a technological bias coordinate.

8. The method of claim 1, further comprising training the deep learning neural network with training data by an unsupervised training method and assigning user-comprehensible meaning to one or more of the plurality of bias coordinates.

9. The method of claim 1, wherein an indication of a respective bias is provided to the user in response to determining that a respective one of the plurality of bias coordinates exceeds a threshold.

10. The method of claim 1, further comprising, providing a de-biased version of a string to text to the user.

11. The method of claim 1, further comprising obtaining biometric sensor data regarding the user and further applying the biometric sensor data to the deep learning neural network to generate the plurality of bias coordinates.

12. The method of claim 1, further comprising parsing the text into a plurality of subsections of text, wherein applying the text to the deep learning neural network includes applying one or more of the plurality of subsections of text to the deep learning neural network to generate one or more respective pluralities of bias coordinates.

13. A system comprising:
    one or more processors; and
    a non-transitory memory comprising instructions that when executed cause the one or more processors to perform operations comprising:
        obtaining text from a user;
        applying the text to a deep learning neural network to generate a plurality of bias coordinates defining a point in an embedded space, wherein the embedded space is a multi-dimensional vector space defined by the plurality of bias coordinates, each dimension of the embedded space corresponding to a respective bias and a size of each bias coordinate corresponding to an amount of bias; and
        in response to determining that at least one of the plurality of bias coordinates satisfies a bias threshold, providing an indication of bias to the user.

14. The system of claim 13, wherein obtaining the text from the user includes receiving user input of text into at least one of an instant messaging application, a text messaging application, an e-mail application, or a word processing application executed by the one or more processors.

15. The system of claim 13, wherein the text includes one or more emojis.

16. The system of claim 13, wherein the operations further comprise training the deep learning neural network with training data by an unsupervised training method and assigning user-comprehensible meaning to one or more of the plurality of bias coordinates.

17. The system of claim 13, wherein the operations further comprise providing a de-biased version of a string to text to the user.

18. The system of claim 13, further comprising obtaining biometric sensor data regarding the user and further applying the biometric sensor data to the deep learning neural network to generate the plurality of bias coordinates.

19. A system comprising:
    means for obtaining text from a user;
    means for applying the text to a deep learning neural network to generate a plurality of bias coordinates defining a point in an embedded space, wherein the embedded space is a multi-dimensional vector space defined by the plurality of bias coordinates, each dimension of the embedded space corresponding to a respective bias and a size of each bias coordinate corresponding to an amount of bias; and means for, in response to determining that at least one of the plurality of bias coordinates satisfies a bias threshold, providing an indication of bias to the user.

20. The system of claim 19, further comprising means for obtaining biometric sensor data regarding the user and further applying the biometric sensor data to the deep learning neural network to generate the plurality of bias coordinates.

* * * * *